United States Patent
F'Emi Agunloye et al.

[11] Patent Number: 5,351,596
[45] Date of Patent: Oct. 4, 1994

[54] PROCESSING OF POWDER

[75] Inventors: Francis F'Emi Agunloye, Newport; Allistair S. Cox, Warley; Eric H. Foakes, Edgbaston, all of England

[73] Assignee: Albright & Wilson Limited, Warley, England

[21] Appl. No.: 926,497

[22] Filed: Aug. 7, 1992

[30] Foreign Application Priority Data

Aug. 15, 1991 [GB] United Kingdom ............... 9117605

[51] Int. Cl.⁵ .............................................. F42B 33/00
[52] U.S. Cl. .......................................... 86/45; 264/3.4
[58] Field of Search ....................... 264/3.4; 86/45

[56] References Cited

U.S. PATENT DOCUMENTS

| | | | |
|---|---|---|---|
| 4,014,655 | 3/1977 | Brunnberg | 23/266 |
| 4,657,607 | 4/1987 | Perotto et al. | 149/19.4 |
| 4,755,398 | 7/1988 | Buford | 427/216 |
| 4,767,577 | 8/1988 | Müller et al. | 264/3.3 |
| 4,909,868 | 3/1990 | Melvin | 149/109.6 |
| 4,925,600 | 5/1990 | Hommel et al. | 264/3.4 |
| 5,026,443 | 6/1991 | Müller et al. | 149/18 |
| 5,035,843 | 7/1991 | Schmid | 264/3.2 |
| 5,071,892 | 12/1991 | Hoppe et al. | 524/31 |

Primary Examiner—Peter A. Nelson
Attorney, Agent, or Firm—Frishauf, Holtz, Goodman & Woodward

[57] ABSTRACT

A method and apparatus are provided for introducing a flammable powder such as red phosphorus into a hot melt such as an extrudable polymer which is in motion at the point of introduction of the flammable powder.

1 Claim, 3 Drawing Sheets

PROCESSING OF POWDER

This invention relates to the processing of powder, for example introducing powdery additives into extrudable materials and in particular to the introduction of potentially flammable or explosive powders such as red phosphorus into hot fluids such as hot extrudable polymers.

Red amorphous phosphorus has been known since 1965 as an effective flame retardant for polymers. However, previous processes for its incorporation into such polymers have not been satisfactory owing to flammability and explosivity problems associated with the handling of powdered red phosphorus.

It should be noted that the term "powder" as herein employed is intended to cover those particulate materials whose particle size is sufficiently small that there is risk of substantial numbers of particles being entrained or suspended in air or gas currents during normal handling, including those that exist naturally in a powdered form and those which are obtained in such a form via any physical or chemical means such as pulverisation or precipitation.

In a first aspect, the present invention provides a method for introducing a flammable powder into a hot melt, said hot melt being in motion at the point of introduction of said flammable powder, said method comprising the following steps:

conveying said flammable powder into a transition zone;

conveying said flammable powder from said transition zone to a mixing zone and mixing said flammable powder with said hot melt in said mixing zone;

admitting an inert gas into said transition zone and maintaining an inert positively pressurised atmosphere in said transition zone, and cooling said transition zone sufficiently to prevent ignition of said powder.

The present invention also provides a material made by the method described in the immediately preceding paragraph.

In a third aspect, the present invention provides an apparatus for introducing a flammable powder into a hot melt, said apparatus comprising:

a transition chamber provided with an inlet for said powder;

means adapted to admit an inert gas into said transition chamber to provide a positively pressurised inert atmosphere therein;

means adapted to feed said powder through said inlet against said pressure;

a mixer;

means for passing a stream of said melt through said mixer;

and a conveyor adapted to convey said powder from said transition chamber to said mixer:

wherein said mixer is adapted to convey and to mix said flammable powder and said hot melt.

The present invention further provides a material made by means of the apparatus described in the immediately-preceding paragraph.

Preferred features of the apparatus of the present invention are described as follows:

The mixer may be any of those known in the art and capable of transferring materials under gas tight conditions, such as extruders.

In a preferred embodiment, the mixer comprises a co-rotating twin screw compounding extruder, with length to diameter ratio in the range of from 15:1 to 35:1, such as 28:1 to 31:1 or 20:1. to 24:1, especially 22:1, wherein said mixer is adapted both to convey material and to mix material under pressure with the exclusion of gas by virtue of its comprising alternate sections comprising either coarse screw threads or fine, intermeshing space filling screw threads, e.g. those which are trilobal in cross section, respectively.

The conveyor may be likewise any of those known in the art and capable of transferring materials under gas tight conditions. Most preferably the conveyor is a side feeder for powder addition as is conventionally known in the art and which is fitted to the mixer.

In the most preferred embodiment, according to the present invention, said conveyor is provided with an opening over which is fixedly mounted said transition chamber, the location of said transition chamber with respect to said opening being such that a gas tight seal is provided around said opening. The transition chamber is preferably constructed of a structurally-rigid material, such as a light-weight metal, and may conveniently comprise a housing of a substantially parallelepiped configuration. The transition chamber may be provided with a pressure confirming means adapted to release excess pressures.

Suitably, the housing comprises a body and a lid, wherein said lid is adapted to be released when a dangerous pressure is reached within the body, e.g. said lid may be connected to said body by means of pre-stressed spring-like clips. In a highly-preferred embodiment of the present invention, said transition chamber includes means for permitting internal viewing. For example, the lid may be constructed of a substantially transparent material such as polymethyl methacrylate (commercially available under the Registered Trade Mark PERSPEX). Preferably, said transition chamber is electrically-earthed.

The inert atmosphere may suitably comprise any gas which is unreactive with the powder, typical examples include gaseous carbon dioxide and/or nitrogen but carbon dioxide is preferred. The means for admitting said inert gas into said transition chamber may typically comprise a gas-tight entry port to said transition chamber wherein said port admits a delivery tube for said inert gas. Said delivery tube may conveniently be made of a semi-flexible material, e.g. semi-flexible copper and is typically fitted to convey the inert gas e.g. carbon dioxide to as near the conveyor, e.g. screw extruder, as is practicable. The amount of inert gas delivered into the transition chamber is dependent on the capacity and production rate of the apparatus. A typical flow rate would be from 6 to 12 liters per minute of inert gas.

Preferably, the transition chamber is provided with a pressure-confirming means, wherein said pressure-confirming means may comprise a pressure-regulator coupled in a gas-tight manner to a port in the transition chamber. Suitably, said pressure-confirming means comprises a glass flow-tube, or, more preferably, an oil or water seal, typically of height of about 5 mm, and preferably positioned so as to provide an exit for inert-gas from the transition chamber at the highest point of said chamber.

It is preferred that the means for feeding powder to the transition chamber and the conveyor are positioned such that any height differential therebetween is miniraised. This can have the advantage of reducing the formation of dust clouds of flammable powder.

The apparatus preferably comprises means for cooling the transition zone and the conveyor.

Said cooling is suitably achieved by means of a water jacket wherein said jacket is preferably interposed between said transition chamber and the mixer in such a manner that cooling of the flammable powder within said transition chamber is achieved without concomitant cooling of the hot melt contained in said mixer.

It is preferred, in the present invention, to provide an inert atmosphere for parts of the apparatus in addition to the transition chamber and the mixer, especially where said parts comprise a dispensing means for admission of the flammable powder to the transition chamber, especially where said flammable powder comprises powdered red phosphorus. Accordingly it is preferred that inert gas, e.g. carbon dioxide, is piped to said means, typically a dispenser hopper of conventional construction, so as to blanket the flammable powder, e.g. red phosphorus, therein.

It is preferred that the method of the present invention be carried out in an apparatus incorporating one or more of the hereinabove described features.

The present invention provides a process for the incorporation of powdered red phosphorus into thermoplastic polymers and thermoplastic elastomers such as polyethylene, polypropylene, ethylene vinyl acetate, polyamides (e.g. nylon 6, 66 and 12), styrenic polymers (e.g. acrylonitrile - butadiene-styrene and high impact polystyrene).

SPECIFIC DESCRIPTION

A preferred embodiment of the present invention will be illustrated, merely by way of example and with reference to the accompanying drawings.

In the drawings (wherein like numerals denote like parts) FIG. 1 is a schematic block diagram showing the relationship between the transition chamber of the present invention and the remainder of the apparatus.

Figure 1:
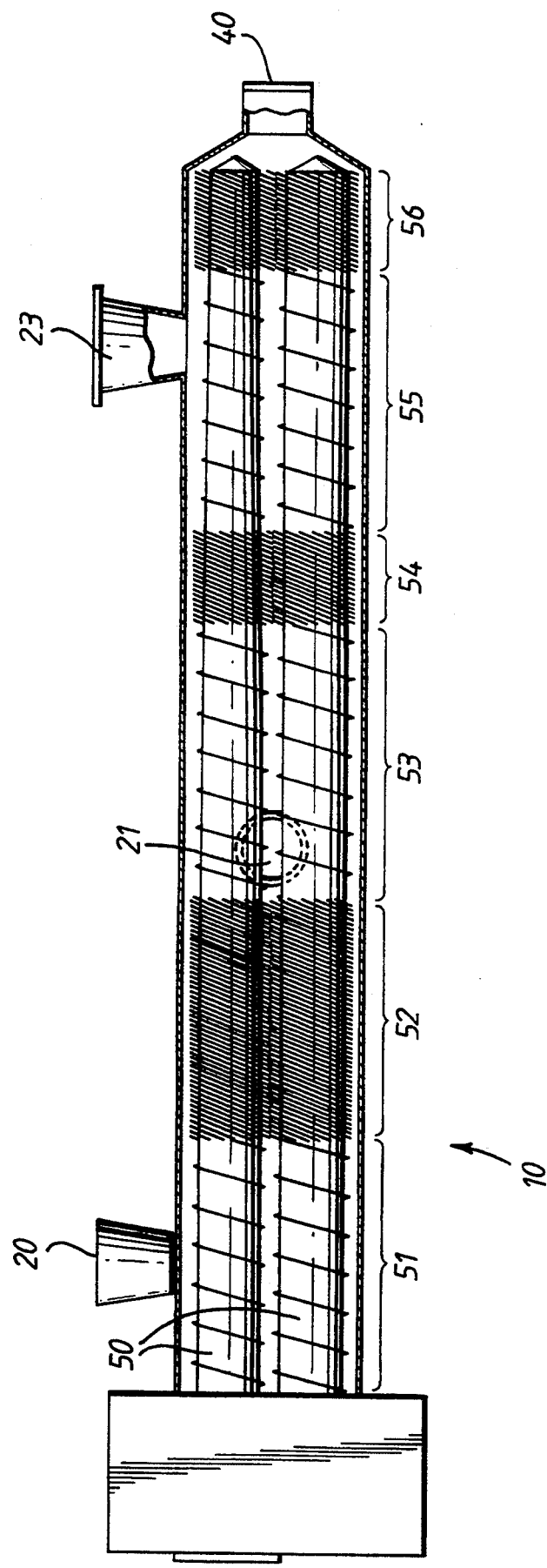
Figure 2:
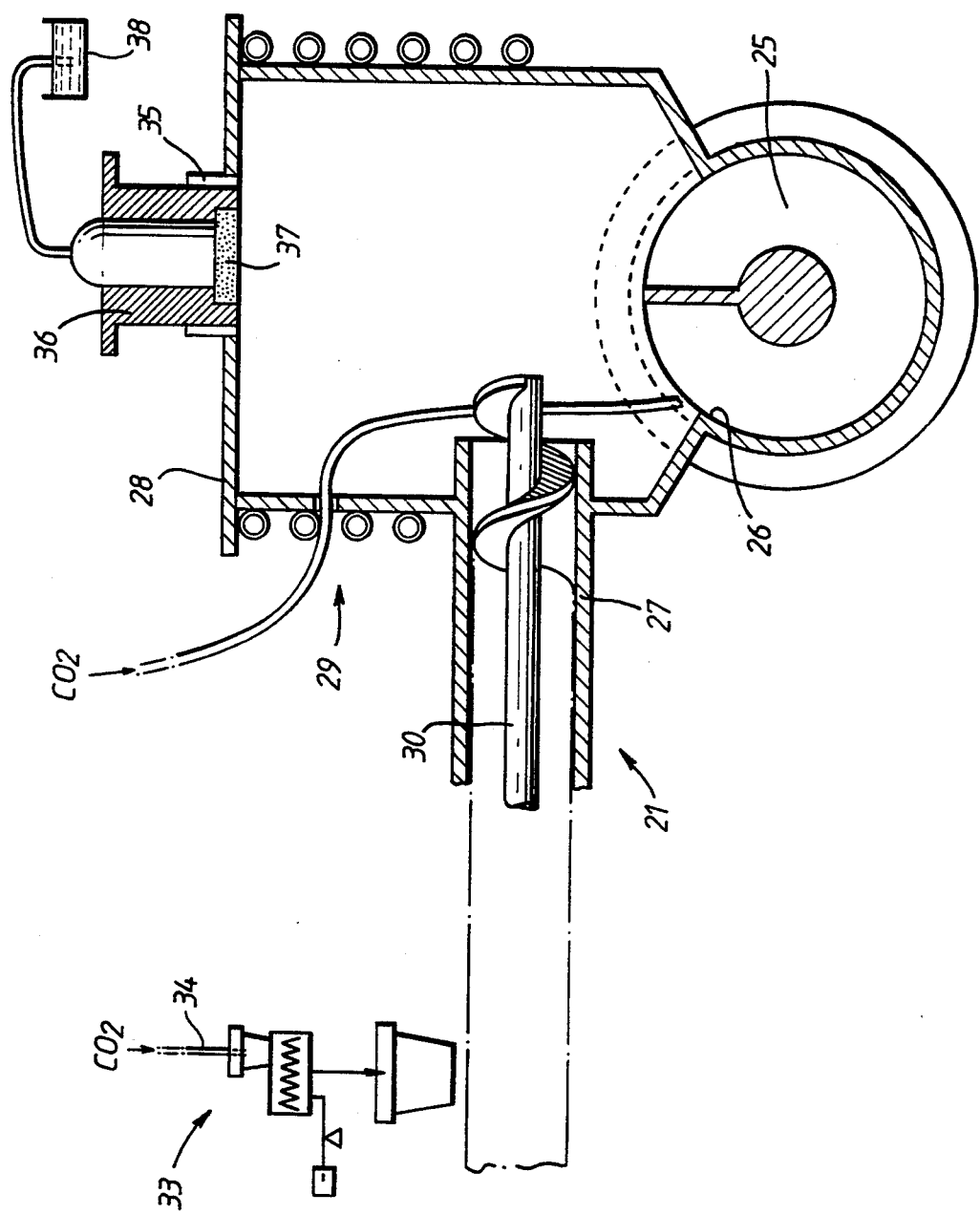
FIG. 2 is an elevation of the transition chamber, partly- sectioned.
Figure 3:
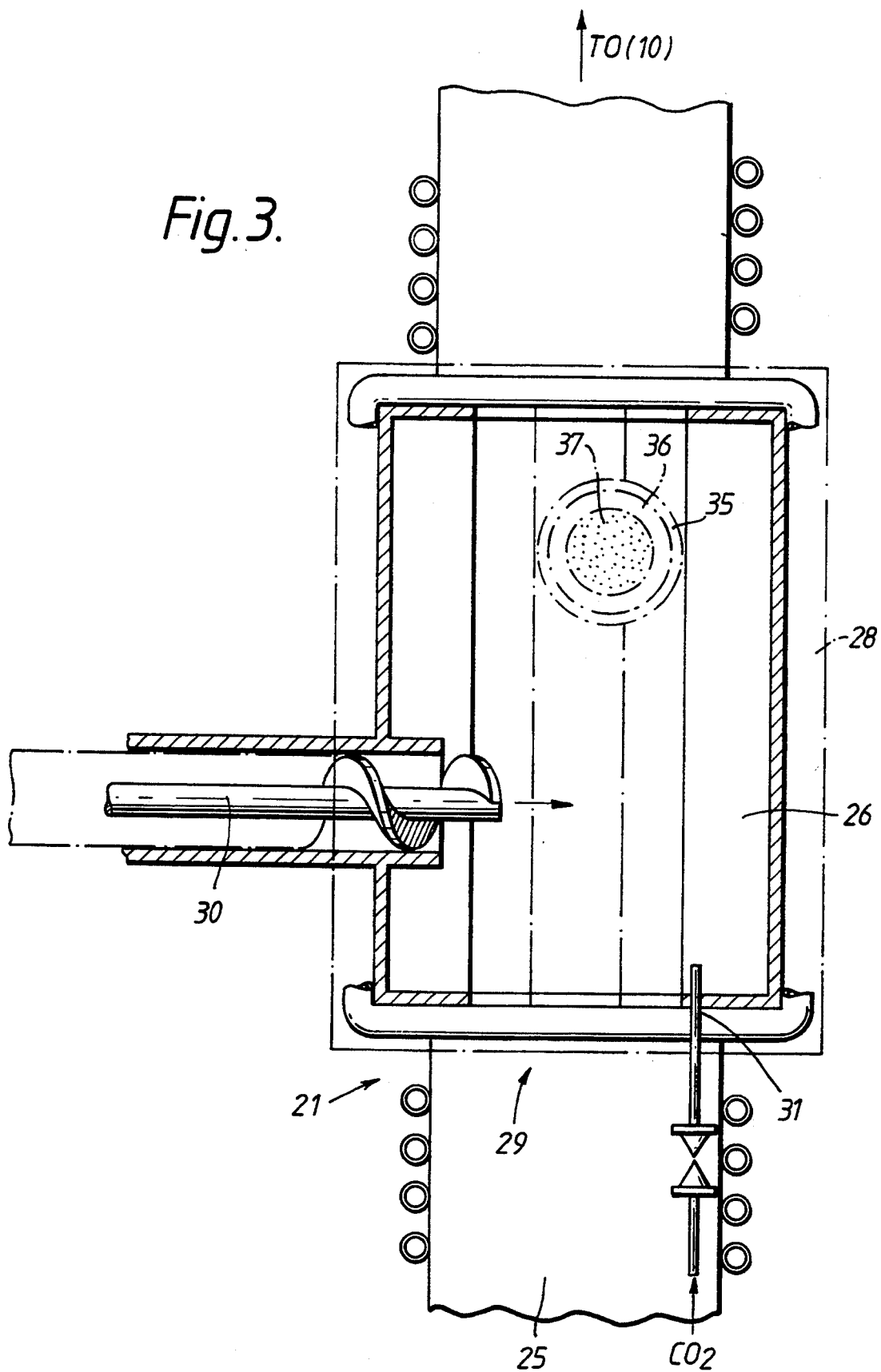
FIG. 3 is a plan view of the apparatus, with parts cut away.

A mixer (10) consists of a compounding extruder which is provided with co-rotating twin screws (50) extending through, a polymer inlet (20) at its upstream end and a conventional venting system for volatiles (23) near its downstream end and a perforated die (40) at its extreme downstream end.

Mixer (10) further comprises a powder inlet (21) downstream with respect to the polymer inlet (20).

The apparatus further comprises a powder feed mounted transversely to the mixer (10) and comprising a water jacketed transition chamber (29) and a water jacketed screw conveyor (25) from the transition chamber (29) to the powder inlet (21).

The transition chamber (29) is provided with an opening (26) in gas tight communication with the screw conveyor (25), a lid (28) resting freely on the chamber (29), an inlet for powder (27), said powder inlet (27), being positioned at minimum drop height with respect to screw conveyor (25) and said inlet (27) accommodating, in a gas-tight manner, a screw conveyor (30) from a gas-tight powder dispenser (33) to said inlet (27). The transition chamber (29) further comprises an inlet for inert gas (31) and, included in the said lid (28) a substantially annular port (35) around which is connected, in a gas-tight manner, a coupling (36) which surrounds, in a gas-tight manner, a filter (37) over which is mounted a pressure confirming and regulating device (38). In the illustrated embodiment said device (38) is a water seal.

Co-rotating twin screws (50) extend through mixer (10) and comprise a coarse threaded screw flight section (51) which is located at the extreme upstream end of mixer (10) in the vicinity of polymer inlet (20) and which is followed by a section of fine intermeshing space filling threads (52) located in the region extending downstream with respect to polymer inlet (20) and terminating immediately upstream from powder inlet (21).

A further coarse threaded screw flight section (53) follows, which is located in the vicinity of powder inlet (21) and which is connected to a section of fine intermeshing space filling threads (54) located in the region extending downstream from powder inlet (21) and terminating immediately upstream with respect to vent (23).

Screw flight section (54) is followed by a final coarse threaded section (55) which is located in the vicinity of vent (23) and which precedes a final section of fine intermeshing space filling threads (56), the section (56) being located at the downstream end of mixer (10) and impinging on perforated die (40).

In practising the method of this invention, powder is supplied to screw conveyor (30) via the powder dispenser (33), which is maintained under an inert atmosphere by inert gas supplied from the delivery tube (34) and enters the water jacketed transition chamber (29), whereby it is shielded from heat generated in mixer (10), and furthermore whereby it is maintained under an inert atmosphere by means of inert gas supplied through inlet (31), and confined by lid (28), the pressure of said inert gas in the apparatus being regulated by water seal (38).

Screw conveyor (25) conveys the powder from the transition chamber (29) through powder inlet (21) to the mixer (10), whereupon the powder is mixed with hot melt. Hot melt is derived from polymer granules which are supplied to the mixer (10) via polymer inlet (20) and conveyed downstream along mixer (10) by means of coarse screw thread section (51), whereupon the polymer granules are pressurised with the exclusion of gas and masticated by fine intermeshing screw thread section (52), producing hot melt, which is conveyed further downstream along mixer (10) by coarse screw thread section (53) and concomitantly mixed with powder supplied to mixer (10) via powder inlet (21). The polymer and powder are then compounded and pressurised with the exclusion of gas, by fine intermeshing screw thread section (54) before being conveyed further downstream along mixer (10) by coarse screw thread section (55). The depressurisation thus achieved permits venting of volatiles through vent (23). Fine intermeshing screw thread section (56) causes a final repressurisation of the compounded powder and polymer which is then extruded through perforated die (40), cooled, diced, dried and collected.

We claim:

1. An apparatus for introducing a flammable powder into a hot polymer salt, said hot polymer melt being in motion at the point of introduction of said flammable powder, said apparatus comprising:

a transition chamber provided with an inlet for said powder wherein said inlet is connected to a screw conveyor connected to a gas tight powder dispenser;

a delivery tube via which an inert gas is supplied to said powder dispenser connected thereto to provide a positively pressurised inert atmosphere in said transition chamber;

a feeder adapted to feed said powder through said inlet against said pressure;

a mixer consisting of a compounding extruder, said extruder having an inlet for polymer at the upstream end thereof and a perforated die at the extreme downstream end thereof, said extruder further including an inlet for powder downstream with respect to said inlet for polymer and a conventional venting system for volatiles near the downstream end of said extruder, wherein co-rotating twin screws extend through said extruder and wherein each of said screws comprises a first coarse-threaded screwflight portion wherein each said first coarse-threadened screwflight portion, extends from the extreme upstream end of said mixer corresponding to said inlet for polymer, a first portion of fine intermeshing space-filling threads extending downstream from said first coarse-threaded portion and terminating immediately upstream from said inlet for powder, a second coarse-threaded screwflight portion extending downstream from said first portion of fine intermeshing space-filling threads and corresponding to the vicinity of said inlet for powder, a second portion of fine intermeshing space-filling threads extending downstream from said inlet for powder and terminating immediately upstream with respect to said venting system for volatiles, a third coarse-threaded portion extending from said second portion of fine intermeshing space-filling threads and corresponding to the vicinity of said venting system for volatiles and a third portion of fine intermeshing space-filling threads extending from said third coarse-threaded portion and being located at the downstream end of said mixer and terminating at said perforated die;

a screw conveyor for conveying said powder from said transition chamber to said mixer, said screw conveyor communicating in a gas tight manner with said transition chamber via an opening, the pressure within said chamber being regulated by means of a lid resting freely on said chamber, said powder inlet is positioned at minimum drop height with respect to said screw conveyor and accommodates in a gas tight manner said feeding means, said lid further including a substantially annular port having a filter connected in a gas tight manner thereto, and being connected to a pressure confirming and regulating device comprising a water seal; and said mixer being adapted to convey and to mix said flammable powder and said hot melt.

* * * * *